(12) United States Patent
Arthur et al.

(10) Patent No.: US 7,645,537 B2
(45) Date of Patent: Jan. 12, 2010

(54) MULTI-CELL FUEL CELL LAYER AND SYSTEM

(75) Inventors: Alan R. Arthur, Salem, OR (US); Gary Tarver, Corvallis, OR (US); Daniel A. Kearl, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1185 days.

(21) Appl. No.: 10/686,896

(22) Filed: Oct. 15, 2003

(65) Prior Publication Data

US 2005/0084725 A1   Apr. 21, 2005

(51) Int. Cl.
*H01M 8/04* (2006.01)

(52) U.S. Cl. .............................. 429/34; 429/30; 429/32; 429/38; 429/39

(58) Field of Classification Search ........................ None
See application file for complete search history.

(56) References Cited

U.S. PATENT DOCUMENTS

| | | | |
|---|---|---|---|
| 5,773,160 A * | 6/1998 | Wilkinson et al. | 429/13 |
| 6,312,846 B1 | 11/2001 | Marsh | |
| 6,413,665 B1 | 7/2002 | Blanchet et al. | |
| 6,416,899 B1 | 7/2002 | Wariishi et al. | |
| 6,461,756 B1 | 10/2002 | Blanchet et al. | |
| 6,503,651 B1 * | 1/2003 | Nguyen | 429/34 |
| 6,589,681 B1 | 7/2003 | Yamanis | |
| 6,832,647 B2 * | 12/2004 | Voss et al. | 165/111 |
| 2002/0076598 A1 * | 6/2002 | Bostaph et al. | 429/38 |
| 2002/0098401 A1 | 7/2002 | Barnett | |
| 2003/0022051 A1 * | 1/2003 | Haluzak | 429/34 |
| 2003/0138685 A1 | 7/2003 | Jankowski et al. | |
| 2003/0235745 A1 * | 12/2003 | Mook et al. | 429/35 |

FOREIGN PATENT DOCUMENTS

| | | |
|---|---|---|
| FR | 2347783 | 11/1977 |
| JP | 08-213043 | * 8/1996 |
| WO | WO 03043117 | 5/2003 |

\* cited by examiner

*Primary Examiner*—Jonathan Crepeau
*Assistant Examiner*—Tony Chuo (57) ABSTRACT

A fuel cell layer includes a substrate, an array of fuel cells each having an anode, a cathode, and an electrolyte disposed on the substrate, conductors electrically coupled to the fuel cell array, a fuel flow channel defined in an anode side of the substrate; and a cathode air flow channel defined in a cathode side of the substrate.

6 Claims, 9 Drawing Sheets

MULTI-CELL FUEL CELL LAYER AND SYSTEM

BACKGROUND

During the past several years, the popularity and viability of fuel cells for producing both large and small amounts of electricity has increased significantly. Fuel cells conduct an electrochemical reaction with reactants such as hydrogen and oxygen to produce electricity and heat. A typical fuel cell includes an electrolyte disposed between two electrodes: an anode and a cathode. Fuel cells are usually classified by the type of electrolyte used into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC). While all fuel cells have some desirable features, solid oxide fuel cells (SOFC) have a number of distinct advantages over other fuel cell types. Some advantages of SOFCs include reduced problems with electrolyte management, increased efficiencies over other fuel cell types (SOFCs are up to 60% efficient), higher tolerance to fuel impurities, and the possible use of internal reforming or direct utilization of hydrocarbon fuels.

Most SOFCs include an electrolyte made of a solid-state material, such as a ceramic, capable of quickly conducting oxygen ions. In order to promote ionic conductivity in the electrolyte, SOFCs typically operate in the 500° to 1000° C. temperature range. An oxidant, such as air, is fed to the cathode, which then creates and supplies oxygen ions to the electrolyte. A fuel such as hydrogen or methane is fed to the anode where the fuel reacts with oxygen ions transported through the electrolyte from the cathode. This reaction produces electrons which are then delivered to an external circuit as useful power. To increase the amount of usable power, multiple fuel cells are grouped in arrays or fuel cell stacks on ceramic substrates. These stacks are, in turn, layered together to form fuel cell systems.

Throughout the operation of an SOFC, each layer is often cycled between room temperature and its full operating temperature. This thermal cycling causes the housing materials to contract and expand according to their coefficients of thermal expansion. This expansion and contraction introduces thermal stresses that may be transferred through the seals and other structural components directly to the ceramic cell. These thermal stresses effectively reduce the service life of an SOFC by compromising the seals or breaking the structurally brittle ceramic cells. Difficulties arise in maintaining a sealing relationship between individual parts while accommodating the thermal cycling.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A fuel cell layer includes a substrate, an array of fuel cells each having an anode, a cathode, and an electrolyte, conductors electrically coupled to the fuel cell array, a fuel flow channel defined in an anode side of the substrate, and a cathode air flow channel defined in a cathode side of the substrate.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1A:
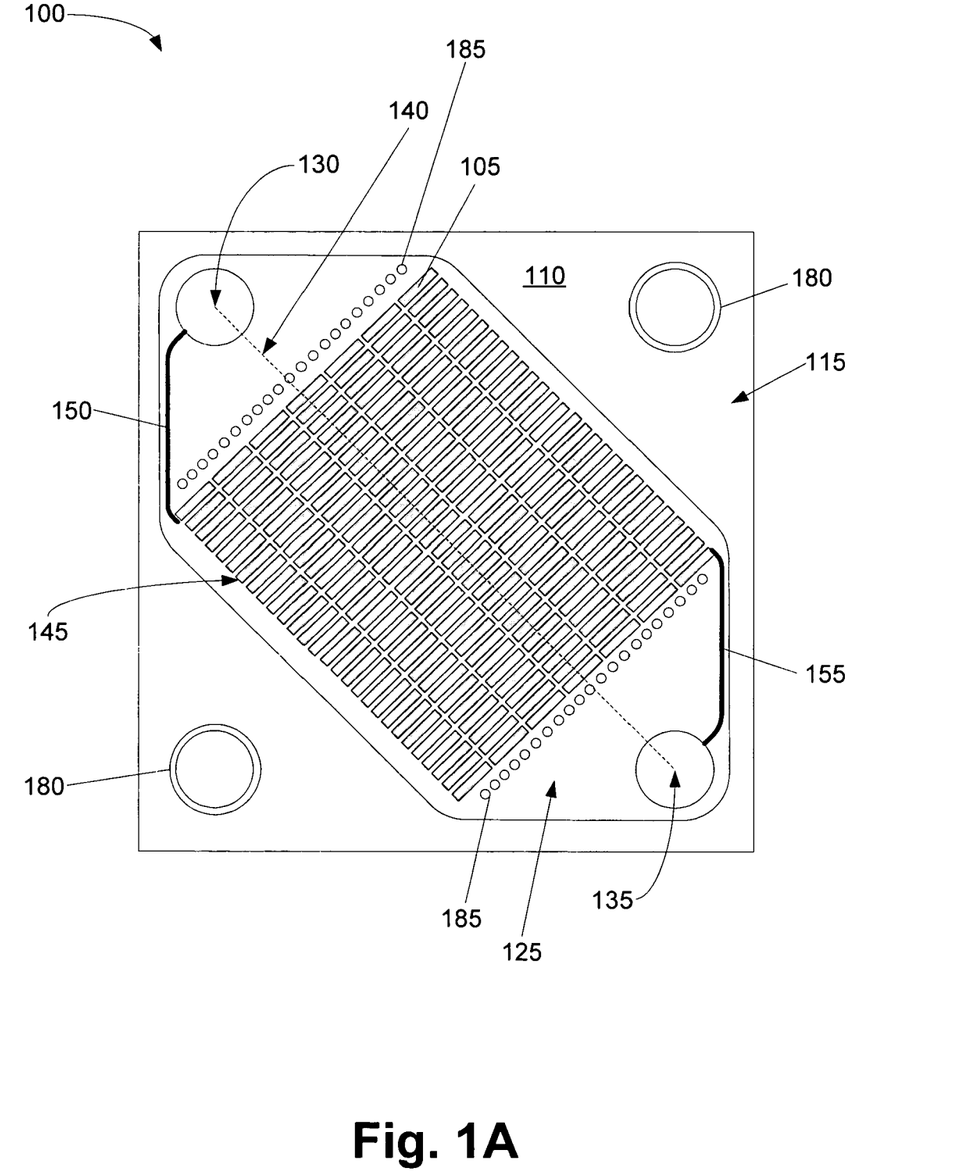
FIG. 1A illustrates a cathode side of a fuel cell layer according to one exemplary embodiment.
Figure 1B:
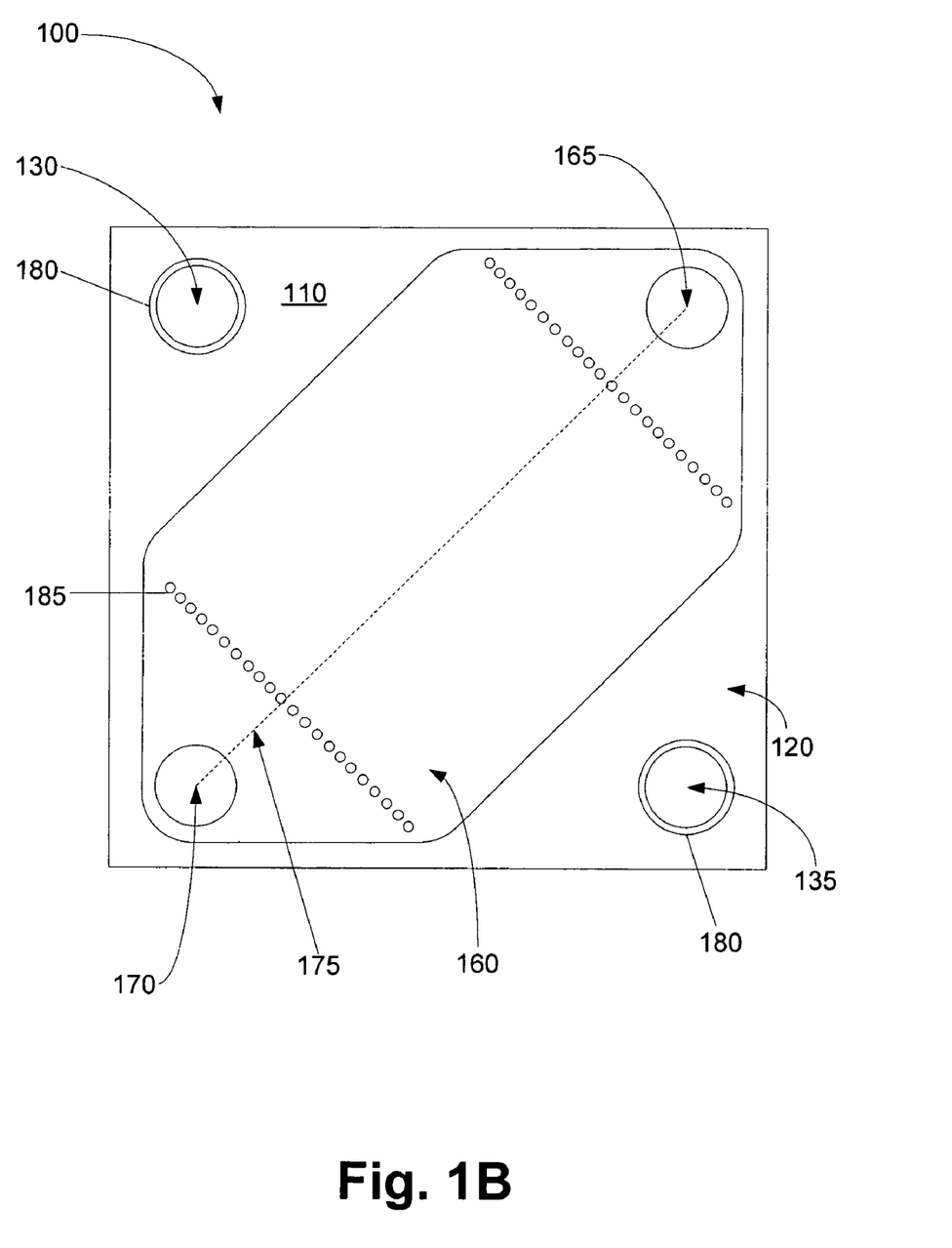
FIG. 1B illustrates an anode side of a fuel cell layer according to one exemplary embodiment.

FIGS. 1A-B illustrate top and bottom views of a fuel cell layer (100) that generally includes a plurality of individual fuel cells (105) formed on a ceramic substrate (110). Each fuel cell includes an anode, a cathode and an electrolyte formed on the substrate (110). The electrolyte may be used to seal non-active portions of the substrate (110). The fuel cell layer (100) includes two opposing sides, a cathode side (115, FIG. 1A), and an anode side (120, FIG. 1B).

FIG. 1A illustrates the cathode side (115), in which a cathode air flow channel (125) is defined in the substrate (110). The cathode air flow channel (125) is a depression, trench, channel or the like formed in the substrate (110) and which runs between, and is in fluid communication with, a cathode air inlet (130) and an excess cathode air outlet (135). The width of the channel (125) accommodates the array of fuel cells (105). As shown in FIG. 1A, the cathode air inlet (130) and excess cathode air outlet (135) are located in opposing corners of the substrate (110). The cathode air flow channel (125) includes an air flow axis (140). During operation, the cathode air flows through the cathode air flow channel (125) in a direction that is generally parallel to the air flow axis (140). The cathode air flows from the cathode air inlet (130) through the cathode air flow channel (125) and out the excess cathode air outlet (135) while also flowing across the individual fuel cells (105). The individual fuel cells are formed on the cathode side (115) of the substrate (110) and form a fuel cell stack (145). The fuel cell stack (145) may be a planar array. Each of the individual fuel cells (105) is connected in series with adjacent fuel cells in the fuel cell stack (145). A positive conductor (150) is coupled to the fuel cell stack (145) and leads to the cathode air inlet (130). A negative conductor (155) is also coupled to the fuel cell stack (145) and leads to the excess cathode air outlet (135). Accordingly, the cathode side (115) serves as the circuit side of the fuel cell layer (100) providing positive voltage.

FIG. 1B illustrates the anode side (120) of the substrate (110) in which a fuel flow channel (160) is defined in the substrate (110). The fuel flow channel (160) is a depression, trench, channel or the like formed in the substrate (110) which runs between, and is in fluid communication with, a fuel inlet (165) and an exhaust (170). The width of the fuel flow channel (160) depends on the width of the array of fuel cells (105) and generally corresponds to the width of the cathode air flow channel (125). As shown in FIG. 1B, the fuel inlet (165) and exhaust (170) are defined in opposing corners of the substrate (110). The fuel inlet (165) and the exhaust (170) are defined in the two opposing corner that are not occupied by the cathode air inlet (130, FIG. 1A) and excess cathode air outlet (135, FIG. 1A). The fuel flow channel (160) includes a fuel flow axis (175). During operation, fuel flows through the channel (160) in a direction generally parallel to a fuel flow axis (175). The fuel flows from the fuel inlet (165) through the fuel flow channel (160) and out the exhaust (170) while also flowing across the substrate surface (110). The fuel flow channel (160) is on the opposite side of the fuel cell stack as the air flow channel (125, FIG. 1A).

The fuel flow axis (175) is at an angle to the air flow axis (140, FIG. 1A). In the illustrated implementation, the air flow axis (140) and the fuel flow axis (175) are substantially normal to each other, with each crossing the substrate (110) diagonally between an opposing inlet and outlet or exhaust. Accordingly, the configuration of the fuel cell stacks illustrated provides an arrangement for the flow of cathode air and fuel such that the air and fuel flow in crossed directions on opposite sides of the substrate (110).

Seals (180) are disposed on the cathode side (115) of the fuel inlet (165) and exhaust (170) and on the anode side (120) of the cathode air inlet (130) and the excess cathode air outlet (135). The configuration of the seals (180) will be discussed in more detail below.

To enhance fuel or air flow over the fuel cell layer (100), flow modification features, such as an array of baffles (185), may be placed in the fuel and/or air streams. Such flow modification features may provide improved fuel cell layer performance by increasing the turbulence of the fuel and air streams, or adjusting the spatial distribution of the flow in the plane of either the air or fuel flows. These modification features (185) can be designed to achieve uniform flow fields across both sides of the fuel cell layer (100). Individual fuel cell layers may be stacked to form a fuel cell layer which may be part of a fuel cell system as discussed below.

Exemplary Implementation and Operation

Figure 2A:
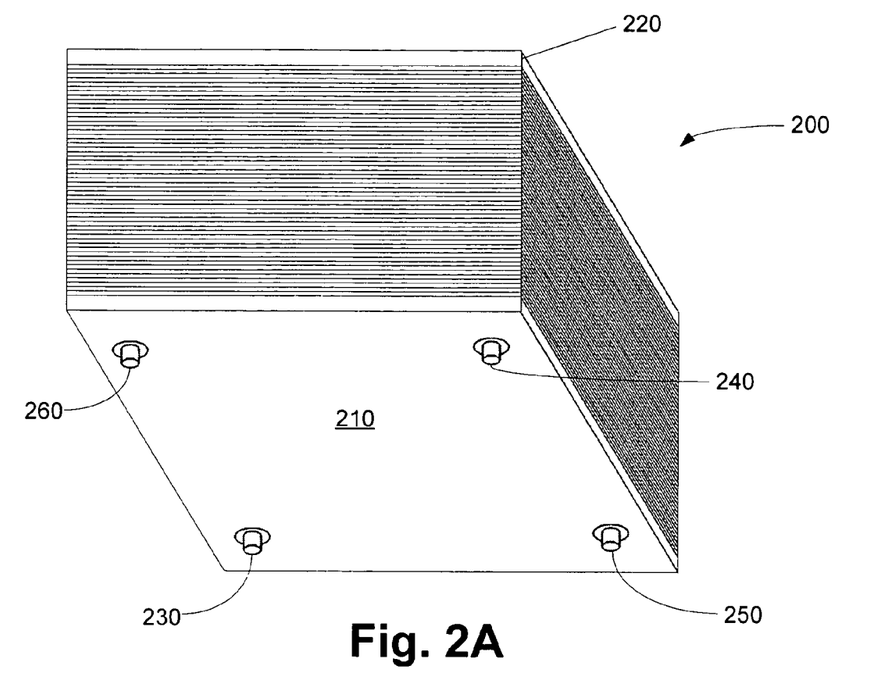
FIG. 2A illustrates a bottom view of a fuel cell system according to one exemplary embodiment.
Figure 2B:
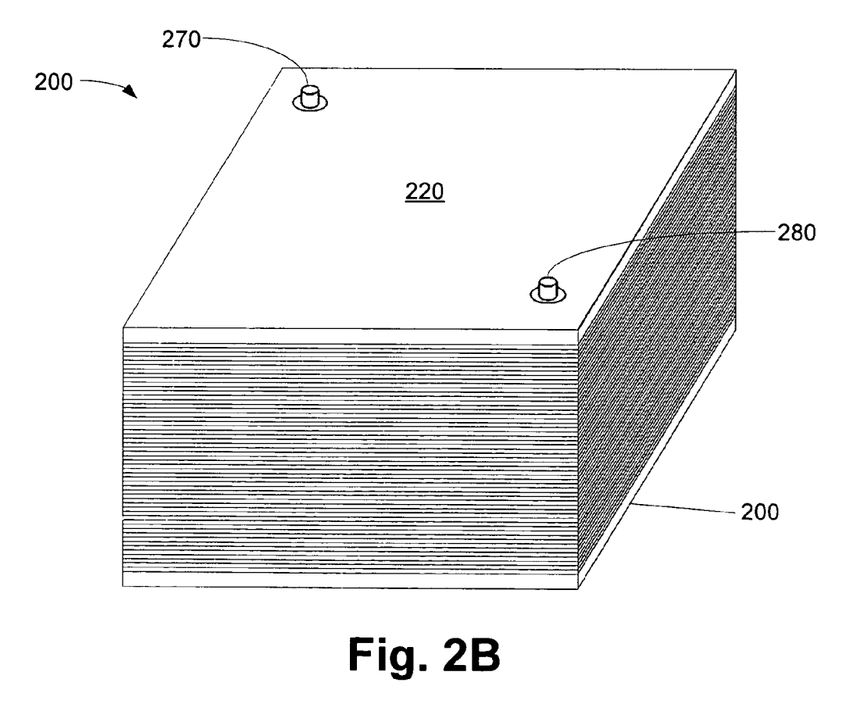
FIG. 2B illustrates a top view of a fuel cell system according to one exemplary embodiment.

FIGS. 2A and 2B illustrate top and bottom views of a fuel cell system (200) in which a plurality of fuel cell layers (100, FIGS. 1A and 1B) have been grouped together. The fuel cell layers (100) are contained between a base (210) and a cap (220). The base (210) includes air and fuel routing members. Fresh cathode air is introduced to the system through cathode air inlet (230) and excess cathode air is exhausted through excess cathode air outlet (240). Fuel is introduced to the system through fuel inlet (250) and excess fuel and byproducts are exhausted through fuel exhaust (260). As will be described in more detailed below, the cathode air inlet (230), cathode air outlet (240), fuel inlet (250) and fuel exhaust (260) are each fluidly connected to the corresponding inlets and outlets of each of the fuel cell layers (100) that make up the system (200).

The cap (220) includes a positive stack electrical connection (270) and a negative stack electrical connection (280) for withdrawing electricity from the fuel cell system (200). These connections (270 and 280) are electrically connected to the corresponding electrical conductors (e.g., 150 & 155, FIG. 1A) of the fuel cell layers (100) in the system (200). Operation of the fuel cell system (200), including the specific fuel and air routing and the electrical routing will be discussed in more detail below.

Figure 3:
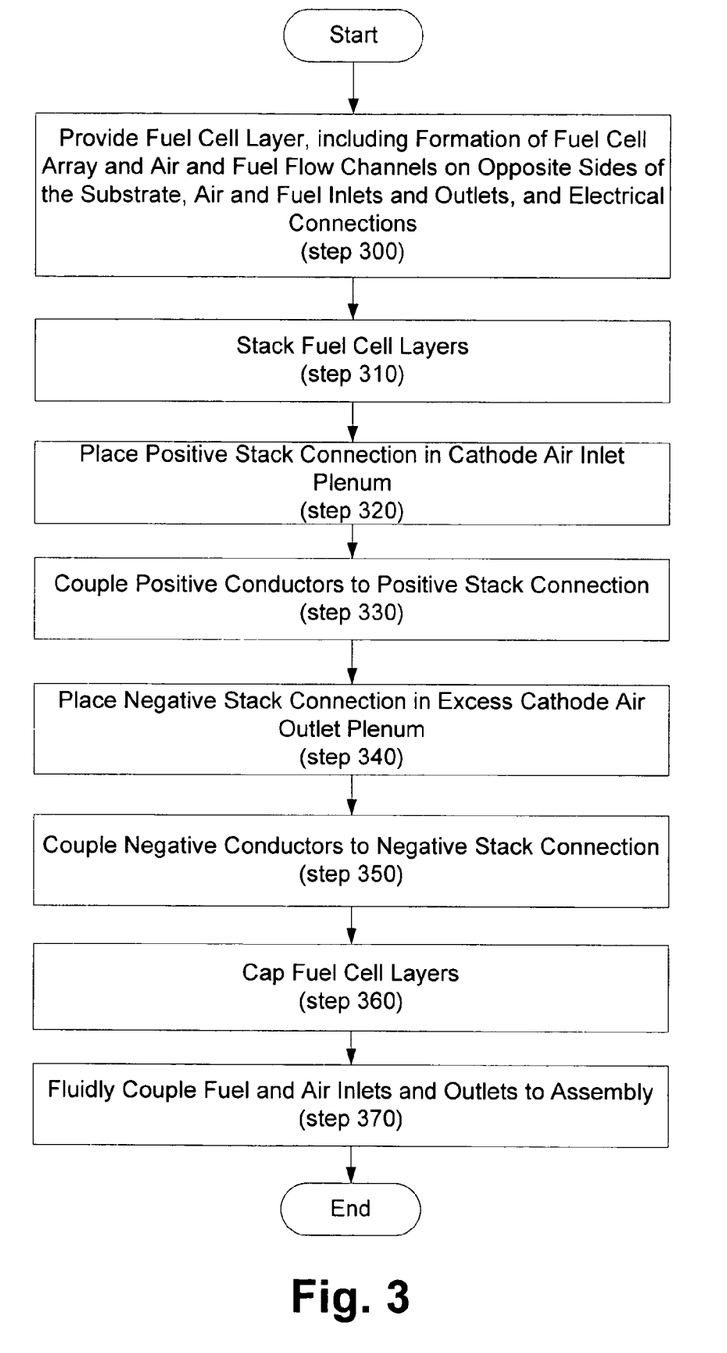
FIG. 3 is a flowchart illustrating a method of using a fuel cell system according to one exemplary embodiment.

FIG. 3 is a flowchart illustrating a method of forming a fuel cell system. The method begins by providing a fuel cell layer (300). The fuel cell layer includes a substrate on which is formed an array of fuel cells. Each of the fuel cells includes an anode, a cathode, and an electrolyte. Adjacent fuel cells are connected such that they are in series electrically. A fuel flow channel and a cathode air flow channel are defined in the opposing sides of the substrate, which may be generally rectilinear. In each of the four corners of the substrate, a flow-through is formed. Two of the flow-throughs formed in opposing corners are a fuel inlet and exhaust outlet that are each coupled to the fuel flow channel. The other two flow-throughs formed in the other opposing corners include a cathode air inlet and an excess cathode air outlet each coupled to the cathode air flow channel.

Conductors are disposed on the same side of the substrate as the cathode air flow channel. The conductors include a positive conductor that is coupled to the fuel cell array and runs to the cathode air inlet. The other conductor is a negative conductor that is also coupled to the fuel cell array and runs to the excess cathode air outlet. Accordingly, the cathode side is the circuit side of the fuel cell layer. Further, as described above, the cathode air flow channel and the fuel flow channel are arranged such that the fuel and the cathode air flow in directions that cross each other, making in a cross-flow arrangement, as the fuel and air flow over opposites sides of the substrate of the fuel cell layer.

The fuel cell layers are then stacked (step 310). The fuel cell layers are alternatingly stacked such that a fuel cell layer shares a fuel flow channel with a first adjacent fuel cell layer on one side and a cathode air flow channel with a second adjacent fuel cell layer on the other side. Seals are disposed around the opposite side of the flow-throughs. For example, seals are disposed on the cathode side of the fuel flow-throughs and on the anode side of the cathode air flow-throughs. Seals are also disposed on both sides of the fuel cell layer around the perimeter. In addition, when stacked the flow-throughs form plenums; the cathode air inlets form a cathode air inlet plenum, the excess cathode air outlets form an excess cathode air outlet plenum, etc. A positive stack electrical connection is disposed partially within the cathode air inlet plenum (step 320) and is coupled to each of the positive conductors (step 330). Similarly, a negative stack electrical connection is disposed partially within the excess cathode air outlet plenum (step 340) and is coupled to each of the negative conductors (step 350).

Once the fuel cell layers are stacked (step 310), the electrical connections made and the air and fuel routing established (steps 320-350), the top and bottom of the stack assembly are capped (step 360) with a stack cap and a stack base, respectively. The electrical connections may protrude out of the stack cap, such that the positive and negative stack connections are readily accessible. Couplings are then fitted (step 370) to inlets and outlets on the base that are in fluid communication with each of the cathode air, fuel, and exhaust plenums for providing fuel and cathode air and exhausting excess cathode air and fuel and byproducts of an electrochemical reaction.

Due to the substantially all-ceramic design, seals may be optimized for one material set instead of splitting the difference between two material sets as is the case with typical SOFC systems. These seals may be conductive or non-conductive. One example of a suitable seal is a ceramic adhesive seal. By having only one ceramic material, designers can tailor the coefficient of thermal expansion (CTE) of the sealant to match the CTE of the ceramic, thus reducing the stresses induced by thermal cycling. This also facilitates the reduction or elimination of the compressive stresses found in typical planar stacks. Less stress in the ceramic may lead to a higher reliability and robustness of design, thereby increasing the viability of fuel cell systems. Further, the sharing of one common fuel and/or air volume between adjacent fuel cell layers facilitates a smaller fuel cell system and reduces the start up energy requirement to bring the stack to temperature.

Figure 4A:
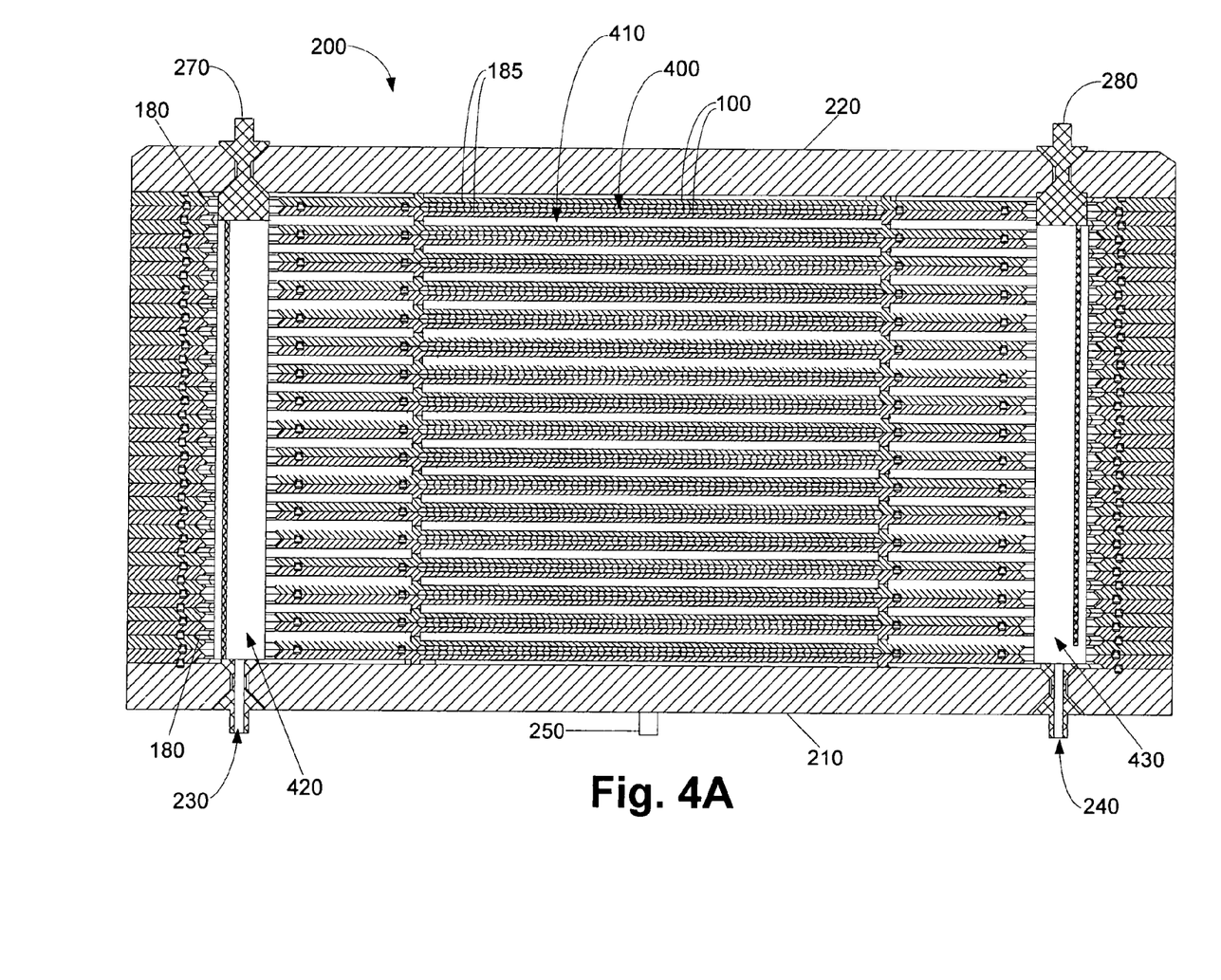
FIG. 4A illustrates a partial cross section of a fuel cell system according to one exemplary embodiment.
Figure 4B:
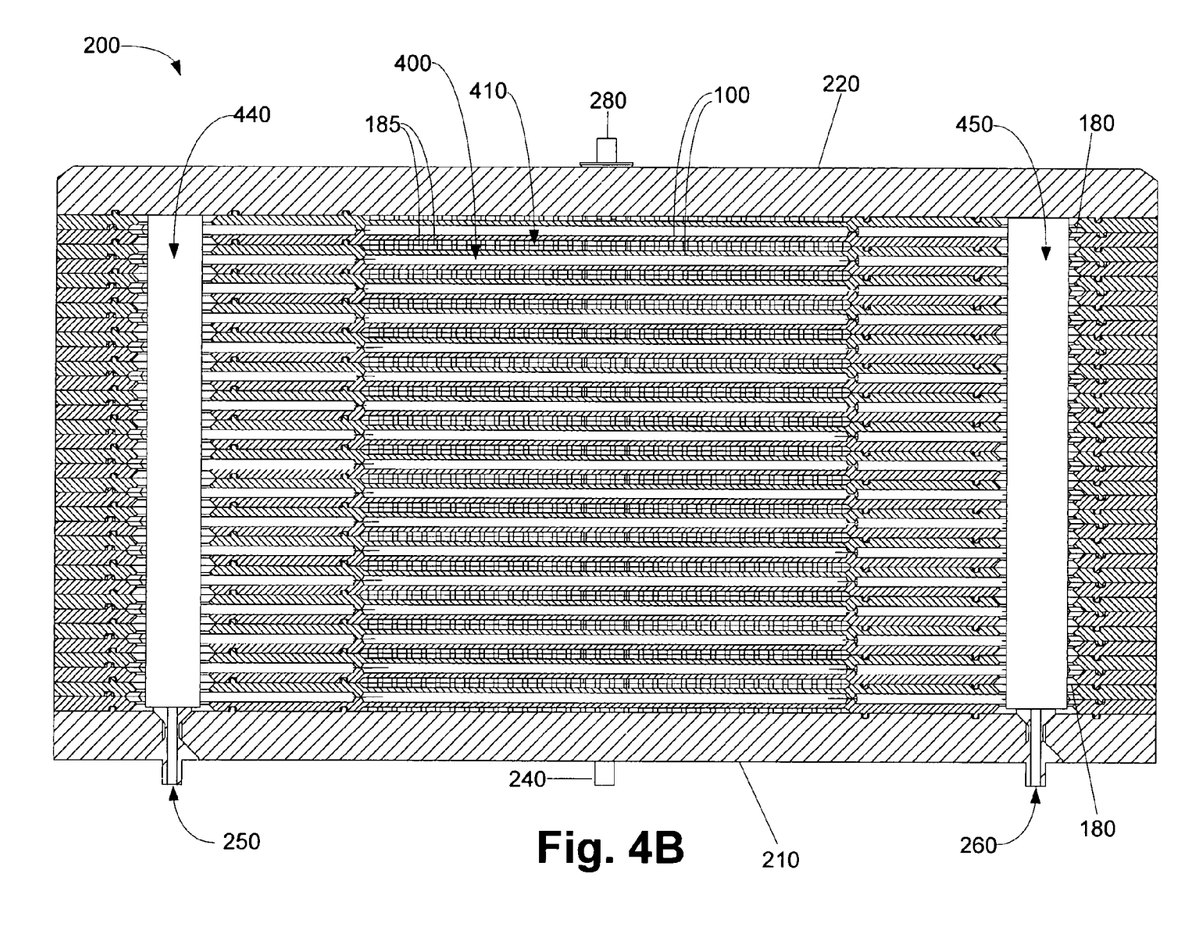
FIG. 4B illustrates a partial cross section of a fuel cell system according to one exemplary embodiment.

FIGS. 4A & 4B illustrate partial cross section views of the fuel cell system (200) in which multiple fuel cell layers (100, FIGS. 1A & 1B) are positioned back to back. As shown in FIG. 4A, the fuel cell system (200) includes alternating fuel flow plenums (400) and cathode air flow plenums (410) formed by grouping fuel cell layers (100) back to back. As seen in FIG. 4, fuel flowing into the fuel flow plenums (400) passes through the baffles (185). In addition, when the cathode air inlets (130, FIG. 1) are grouped together, they form a cathode air inlet plenum (420), while the excess cathode air outlets (135, FIG. 1) form an excess cathode air outlet plenum (430). Cathode air is introduced in the base (210) through cathode air inlet (230) and flows through cathode air inlet plenum (420) to each of the cathode air flow plenums (410) and through excess flow plenum (430) and back out of the base (210) through excess cathode air outlet (240). Seals (180) are disposed between the fuel inlet and exhausts (165, 170, FIG. 1B) on the cathode side (115, FIG. 1A) of the fuel cell layers (100) and prevent fuel from entering the cathode air flow plenums (410). Accordingly, each of the cathode air flow plenums is fluidly coupled to the inlet cathode air plenum (420) and the excess cathode air plenum (430) to form an air routing system.

Each of the conductors (150, 155, FIG. 1) is part of an electrical circuit. Positive conductor (150, FIG. 1) is coupled to positive stack electrical connection (270) which is disposed partially within the cathode air inlet plenum (420). Negative conductors (155, FIG. 1) are coupled to the negative stack electrical connection (280), which is also partially disposed within the excess cathode air outlet plenum (430). The stacking arrangement shown places each of the fuel cell layers or power producing layers in parallel with respect to other fuel cell layers in the electric circuit. Accordingly, fuel cells in each fuel cell layer (100) are in series while the fuel cell layers (100) are in parallel. This configuration of series and parallel circuits can provide higher system voltages. Higher system voltages translate into lower ohmic losses in the system, because of the corresponding reduction in current produced by higher voltages.

FIG. 4B illustrates the flow of fuel through the fuel cell system (100). Fuel inlets (165, FIG. 1) form a fuel inlet plenum (440) while the exhaust flow-throughs (170, FIG. 1) form an exhaust plenum (450). Fuel is introduced in the base (210) through fuel inlet (250) and flows through fuel inlet plenum (440), into fuel flow plenums (400) formed by shared fuel flow channels (160, FIG. 1), through the exhaust plenum (450) and back out the base (210) through exhaust (260). In addition, cathode air flowing through the cathode air flow plenums (410) passes over flow modification features (185). Seals (180) are disposed between the cathode air flow-throughs (130, 135) on the anode sides (120, FIG. 1) of the fuel cell layers (100) and prevent cathode air from entering the fuel flow plenums (400). Accordingly, each of the fuel flow plenums (400) is fluidly coupled to the fuel inlet plenum (440) and the exhaust plenum (450) to form fuel and exhaust routing system.

As described above, cathode air and fuel flow across the fuel cell stacks (140) in a cross-flow configuration. Each of the fuel cell layers (100) comprises one asymmetrical part which represents a reduction in parts over past systems. In addition, the present system provides for higher power output with lower ohmic losses due at least in part to the configuration of the circuit. Further, sealing is maintained without the use of complicated compression assemblies or brittle seals. Such a reduction in parts may allow for less expensive and more reliable fuel cell systems.

Alternative Embodiments

Figure 5:
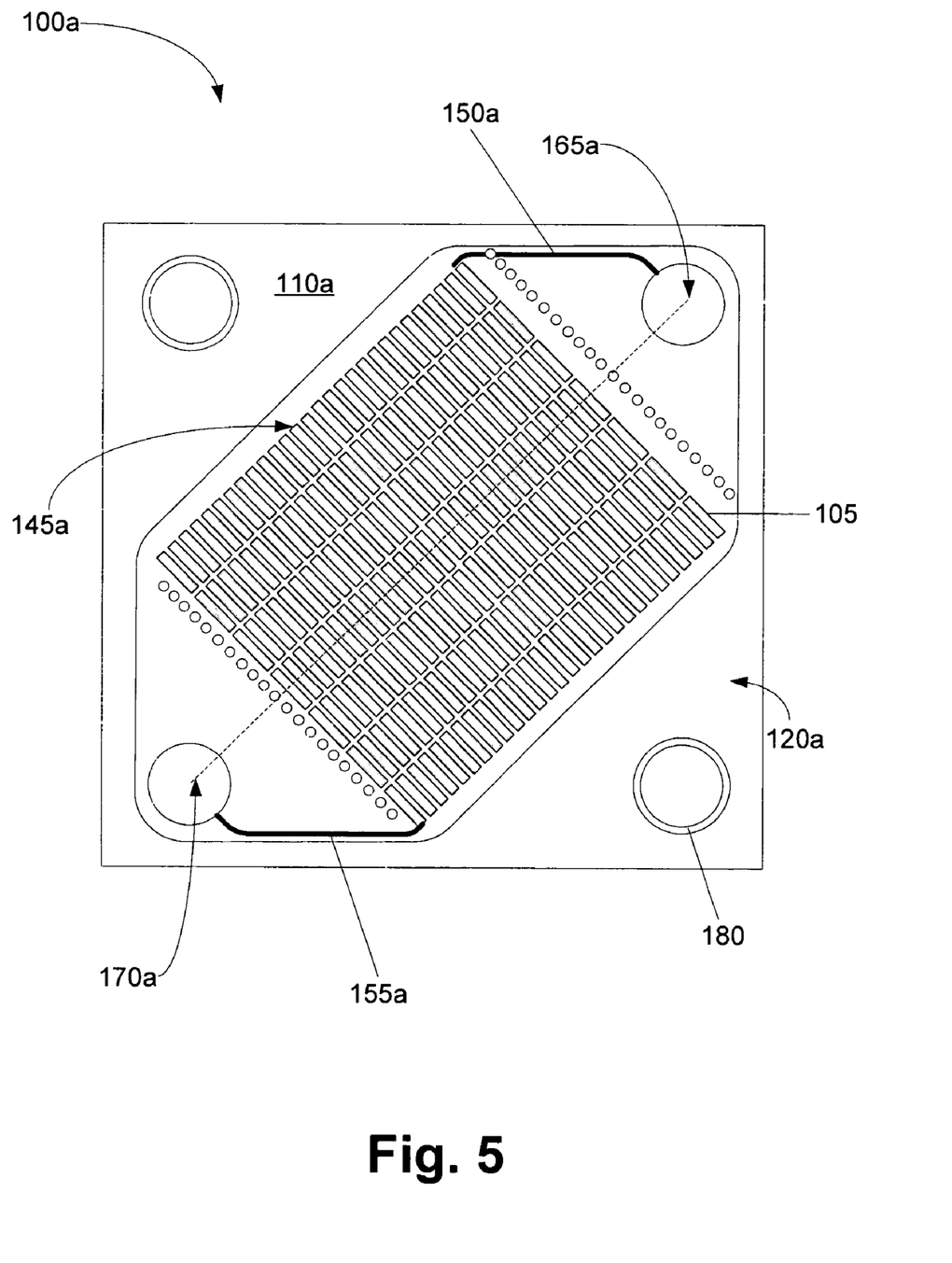
FIG. 5 illustrates an anode side of a fuel cell layer according to one exemplary embodiment.

FIG. 5 illustrates a fuel cell layer (100a) in which individual fuel cells (105) are formed on a cathode side (120a) and forming a fuel cell stack (145a). The fuel cell stack (145a) may be a planar array. In this implementation, the cathodes of the fuel cells (105) are formed nearest the substrate (110a) while the anodes are on the outside. In addition, a positive conductor (150a) is coupled to the fuel cell stack (145a) and leads to the fuel inlet (165a). A negative conductor (155a) is also coupled to the fuel cell stacks (145a) and the exhaust outlet (170a). Accordingly, in this implementation, the anode side (115) serves as the circuit side of the fuel cell layer (100a).

Figure 6A:
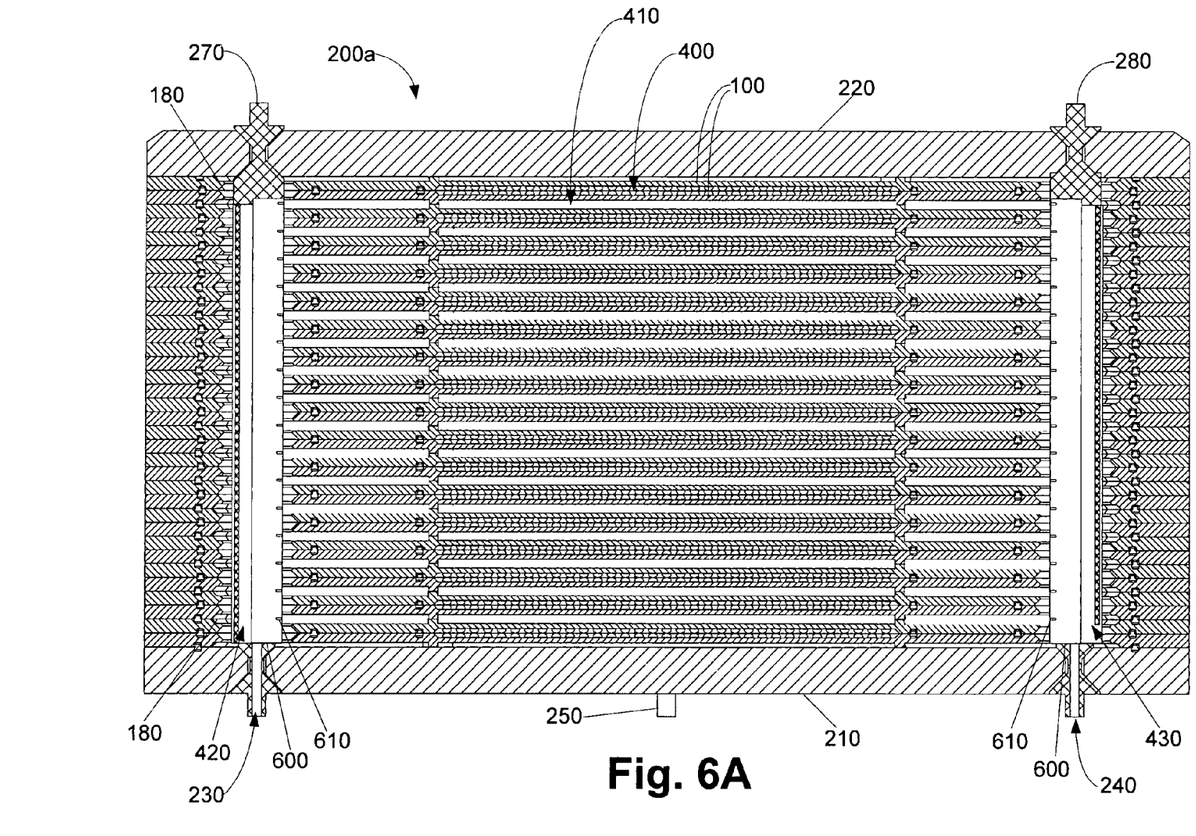
FIG. 6A illustrates a fuel cell system according to one exemplary embodiment.
Figure 6B:
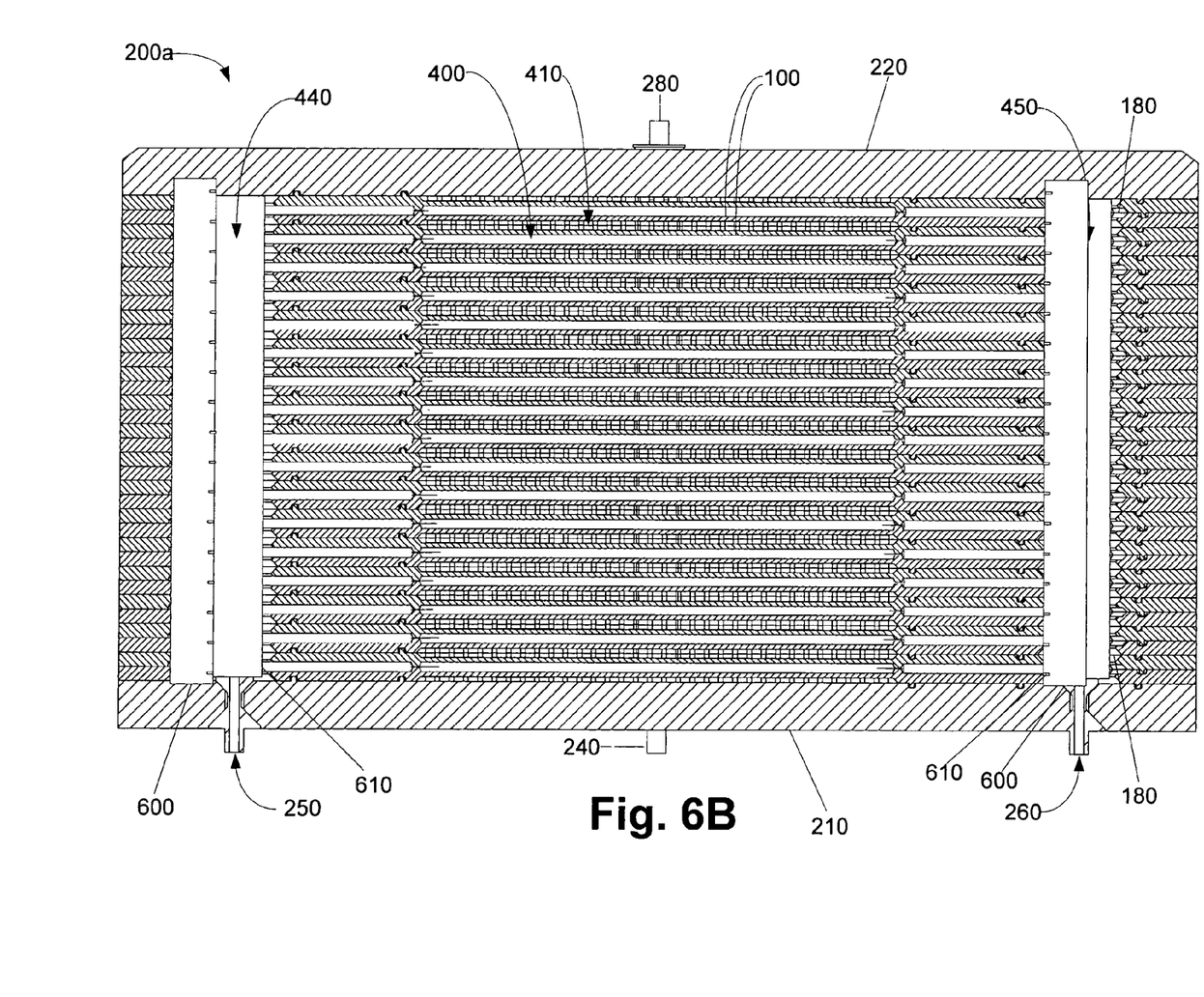
FIG. 6B illustrates a fuel cell system according to one exemplary embodiment.

FIGS. 6A-B illustrate a fuel cell system (200a) in which air and fuel are introduced to and withdrawn from the cathode air plenums (step 410, FIG. 4) and fuel flow plenums (470, FIG. 4) by manifolds (600) having inlet/exhaust ports (610). By introducing fuel and air inlet/exhaust ports, selected layers of the stack could optionally be turned on and off, which would facilitate a much wider dynamic range of power outputs ('load following'), while maintaining fairly uniform stack operating temperature.

In still other embodiments, not shown, the within-plane thermal gradients could be reduced by a controlled spatial variation in the individual cell area that is imaged by a fabrication sequence. These thermal gradients present a challenge for traditional planar SOFC stack designs. In a similar manner, the fuel and air depletion profiles across a given plate could optionally be tailored by varying the cell size and placement within the plane.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A multi-cell fuel cell layer, comprising:
    a substrate having defined therein a fuel inlet, an exhaust, a cathode air inlet, and an excess cathode air outlet;
    an array of fuel cells each having an anode, a cathode, and an electrolyte disposed on said substrate;
    conductors electrically coupled to said fuel cell array;
    a fuel flow channel defined in a first, anode side of said substrate; and
    a cathode air flow channel defined in a second and opposite, cathode side of said substrate.

2. The fuel cell layer of claim 1 wherein said cathode air inlet and said excess cathode air outlet are in fluid communication with said cathode air flow channel.

3. The fuel cell layer of claim 1 wherein said fuel inlet and exhaust are defined in first and second opposing corner portions of said substrate and said inlet cathode air and excess cathode air outlets are defined in third and fourth opposing corner portions of said substrate.

4. The fuel cell layer of claim 1 wherein said conductors comprise a positive conductor extending to said cathode air inlet and a negative conductor extending to said excess cathode air outlet.

5. The fuel cell layer of claim 1 further comprising flow modification features associated with either or both of said fuel flow channel and said cathode air flow channel, said flow modification features being configured to distribute a flow of fuel or air emerging from an inlet across a width of said fuel flow channel or said air flow channel, respectively.

6. The fuel cell layer of claim 5 wherein said flow modification features comprise a plurality of baffles.

\* \* \* \* \*

UNITED STATES PATENT AND TRADEMARK OFFICE
CERTIFICATE OF CORRECTION

| | | |
|---|---|---|
| PATENT NO. | : 7,645,537 B2 | Page 1 of 1 |
| APPLICATION NO. | : 10/686896 | |
| DATED | : January 12, 2010 | |
| INVENTOR(S) | : Alan R. Arthur et al. | |

It is certified that error appears in the above-identified patent and that said Letters Patent is hereby corrected as shown below:

In column 7, line 1, in Claim 2, delete "claim 1" and insert -- claim 1, --, therefor.

In column 7, line 4, in Claim 3, delete "claim 1" and insert -- claim 1, --, therefor.

In column 7, line 9, in Claim 4, delete "claim 1" and insert -- claim 1, --, therefor.

In column 8, line 1, in Claim 5, delete "claim 1" and insert -- claim 1, --, therefor.

In column 8, line 9, in Claim 6, delete "claim 5" and insert -- claim 5, --, therefor.

Signed and Sealed this

Fourth Day of May, 2010

David J. Kappos
*Director of the United States Patent and Trademark Office*